United States Patent
Hasha et al.

(10) Patent No.: US 6,934,269 B1
(45) Date of Patent: Aug. 23, 2005

(54) SYSTEM FOR NETWORKED COMPONENT ADDRESS AND LOGICAL NETWORK FORMATION AND MAINTENANCE

(75) Inventors: Richard L. Hasha, Seattle, WA (US); Bradford A. Christian, Kirkland, WA (US); John E. Elsbree, Redmond, WA (US); Timothy R. Osborne, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/556,279

(22) Filed: Apr. 24, 2000

(51) Int. Cl.$^7$ .............................................. H04L 12/66
(52) U.S. Cl. ....................... 370/312; 709/225; 709/227; 370/328; 370/462
(58) Field of Search ............................... 370/312, 328, 370/462, 393.1, 393.2; 709/220, 225, 226, 228, 206, 224, 227, 232, 201; 382/119; 714/4

(56) References Cited

U.S. PATENT DOCUMENTS

| | | | | |
|---|---|---|---|---|
| 5,825,772 A | * | 10/1998 | Dobbins et al. | ............ 382/119 |
| 6,192,410 B1 | * | 2/2001 | Miller et al. | ................ 709/232 |
| 6,360,331 B2 | * | 3/2002 | Vert et al. | ....................... 714/4 |
| 6,477,150 B1 | * | 11/2002 | Maggenti et al. | ........... 370/312 |
| 6,618,377 B1 | * | 9/2003 | Miriyala | .................. 370/395.1 |
| 6,643,289 B1 | * | 11/2003 | Natanson et al. | ........ 370/395.2 |
| 6,704,768 B1 | * | 3/2004 | Zombek et al. | ............. 709/201 |
| 6,725,264 B1 | * | 4/2004 | Christy | ....................... 709/225 |

* cited by examiner

*Primary Examiner*—Khanh Quang Dinh
(74) *Attorney, Agent, or Firm*—Merchant & Gould PC

(57) ABSTRACT

A system for forming and maintaining one or more networks of devices connected to a shared includes processes for: (a) forming a logical network on the shared media; (b) discovering devices connected to the shared medium; (c) assigning (or acquiring) devices to a logical network; and (d) maintaining a logical network. The system also defines a message format and protocol for communication over the shared media. The protocol uses a two-level address scheme (e.g., a logical network ID and a device ID) and defines several message types used to support the above processes and other useful features. A logical network includes an address space arbiter (ASA) and, typically, one or more devices attached to the shared media. An acquisition authority (AA), interacting with the ASA, is required to complete acquisition of a device by a logical network.

36 Claims, 7 Drawing Sheets

SYSTEM FOR NETWORKED COMPONENT ADDRESS AND LOGICAL NETWORK FORMATION AND MAINTENANCE

BACKGROUND OF THE INVENTION

Many network systems are currently in use in commercial and home environments. For example, computer networks such as the Internet are well known and widely used. The Internet uses the TCP/IP protocol, which requires a significant amount of circuitry and computing power to provide good performance. Of course, such circuitry is relatively costly. On the other hand, some networking applications do not require the high performance of the TCP/IP protocol. One such application is an intelligent home system.

An intelligent home control system requires communication between intelligent household devices in the home system. One approach to implement the communication in an intelligent home control system is to connect devices to a shared medium. However, existing systems tend to provide low performance, support a relatively small number of devices, and require the user to configure devices in forming the network. Further, some conventional systems only support one-way communication from a controller to the devices. Thus, a system for organizing easily configured devices into networks and supporting communication between the networked devices is needed. Further, because the devices can be inexpensive household appliances and the like, it is desirable that the device circuitry to support this system should be inexpensive and small.

SUMMARY OF THE INVENTION

In accordance with the present invention, a system for forming and maintaining one or more networks of devices connected to a shared media is provided. Aspects of the present invention include processes for: (a) forming a logical network on the shared media; (b) discovering devices connected to the shared medium; (c) assigning (or acquiring) devices to a logical network; and (d) maintaining a logical network. Another aspect of the present invention also defines a message format and protocol for communication over the shared media. The protocol uses a two-level address scheme (e.g., a logical network ID and a device ID) and defines several message types used to support the above processes and other useful features. Each device is expected to have a globally unique device ID (GUID).

A logical network includes an address space arbiter (ASA) and, typically, one or more devices attached to the shared media. An acquisition authority (AA), interacting with the ASA, is required to complete acquisition of a device by a logical network.

An ASA can form a logical network by selecting a possible logical network ID, when first attached to the shared media. The ASA then broadcasts a message addressed to the entire shared media to determine whether the possible ID is already taken. If the possible ID is not taken, the ASA adopts the ID as its logical network ID and can begin acquiring devices.

To join a logical network, a device attached to the shared media broadcasts an announce message addressed to the entire shared media. This can be initiated by the device itself, or at the request of an ASA attached to the shared media. ASAs receiving the announce message then determine whether the device is a "discovered" device. If the device is also not acquired, the AA decides whether to authorize the ASA to acquire the discovered device. If authorized, the ASA then assigns an available device ID to the device. The device ID must be unique within the logical network, but does not necessarily have to be globally unique. The ASA helps maintain the logical network by periodically sending a message to each device of the logical network and waiting for the appropriate response from that device.

One advantage is that the system provides a simple way to segment a shared media into several logical networks. In addition, the system provides an easy-to-use mechanism for connecting devices to a network suitable for the general public.

DETAILED DESCRIPTION OF THE PREFERRED EMBODIMENT

Figure 1:
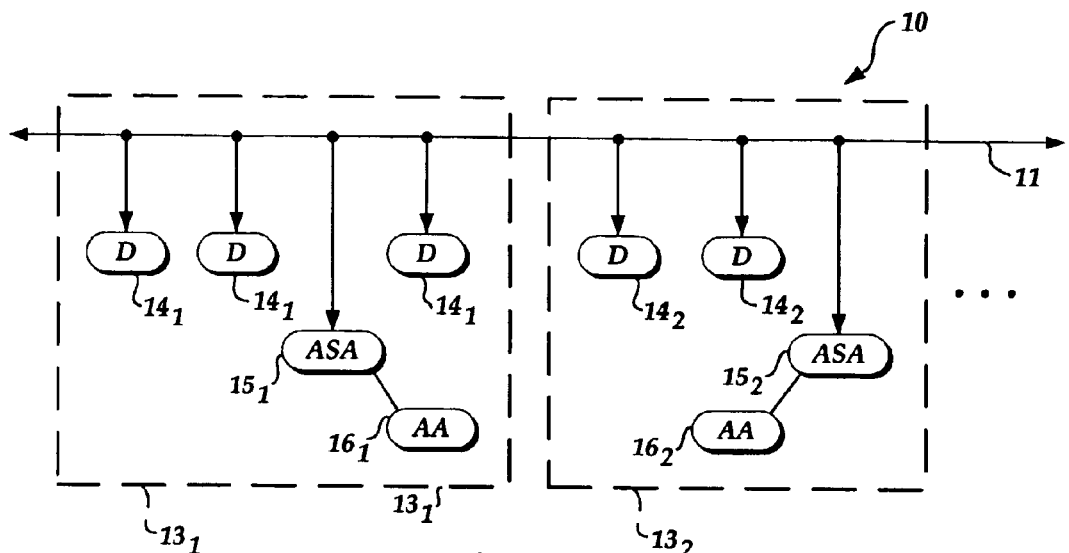
FIG. 1 is a block diagram illustrating a network, according to one embodiment of the present invention.

FIG. 1 illustrates a network 10, according to one embodiment of the present invention. In this embodiment, the network 10 includes a shared media 11 and several logical networks $13_1$, $13_2$ and so on. The network 10 may include any number of logical networks that can be practically coupled to the shared media 11. In one embodiment, the shared media 11 is formed from the power lines of a house, office, factory or other building or buildings. In other embodiments, the shared media can be twisted pair lines, fiber optic lines, telephone lines or coaxial cable lines etc. In still other embodiments, the shared media may be a wireless environment such as, for example, low-power RF and infrared systems. In addition, the shared media can be a combination of two or more of the above media with appropriate interfacing or bridging units.

In general, each logical network contains one or more devices, an address space arbiter (ASA) and an acquisition authority (AA). Thus, as shown in FIG. 1, the logical network $13_1$ includes devices $14_1$, an ASA $15_1$, and an AA $16_1$. The devices $14_1$ and the ASA $15_1$ are connected to the shared media 11. The AA $16_1$ is connected to the ASA $15_1$. Although the logical network $13_1$ includes at least one device, in other embodiments, the logical network may include no devices. This is particularly true when the logical network is first formed.

In one embodiment, the devices $13_1$ are household appliances such as, for example, security system devices, home electronics (e.g., computers, televisions, receivers, VCRs, alarm clocks, etc.), environmental-control units (e.g., lights, air conditioning, etc.), and kitchen devices (e.g., toasters, ovens, coffee maker, etc.), as well as other electronic devices. Further, a device may be a "soft" device or service within a more complex component. For example, a device may be a software process implemented in a computer system. As will be appreciated by those of ordinary skill in the software art, a single computer system may be programmed to implement several "soft" devices. Still further, the ASA may be implemented as a "soft" device in the computer system of a smart appliance. For example, a device may be a television that includes a microprocessor system to implement an ASA, as well as to control the operation of the television. As will be described below, the devices $13_1$ each include an interface and intelligence to interact and communicate with other devices and ASAs over the shared media.

Similarly, the logical network $13_2$ includes one or more devices $14_2$, an ASA $15_2$ and an AA $16_2$, and so on. Although two or more logical networks are indicated in FIG. 1, other embodiments of the network 10 can be formed with only one logical network. The various logical networks can be organized by general function. For example, one logical network can include all of the security devices, while another logical network includes all of the home entertainment devices. A device according to the present invention is described further below.

Figure 2:
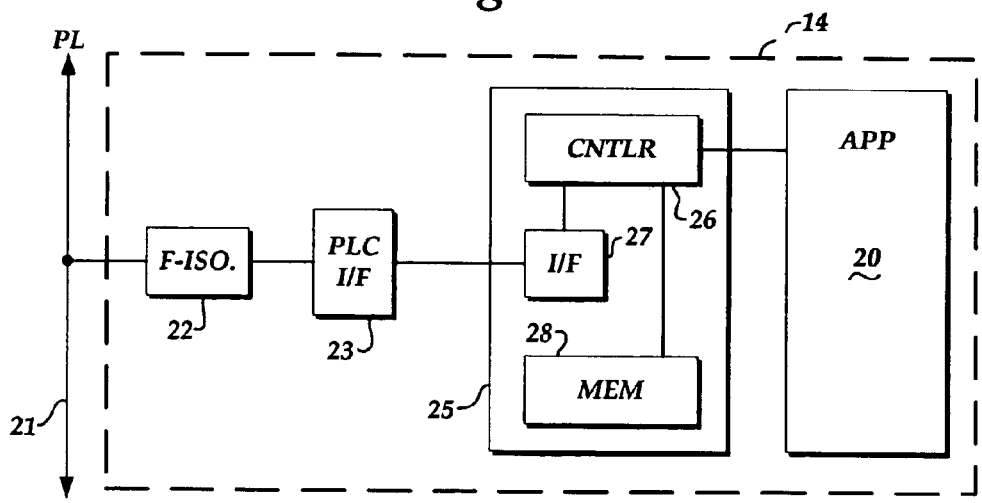
FIG. 2 is a block diagram illustrating a device, according to one embodiment of the present invention.

FIG. 2 illustrates an exemplary device 14, according to one embodiment of the present invention. In this embodiment, the device 14 is part of a household electronic device or appliance 20 such as previously described. Each device is also assigned a globally unique device ID (GUID). In one embodiment, the well known 128-bit Distributed Computing Environment (DCE) GUID standard is used. Typically, the GUID is assigned when the device is manufactured (or installed in the case of a "soft" device). The GUID allows each device to be uniquely addressable.

In this embodiment, the device 14 is configured to be connected to a power-line 21 of household, office, building, etc. The power-line (PL) 21 not only provides power to operate the device, but also serves as a shared media for communication between elements (e.g., devices, ASA) of a logical network. The device 14 includes an isolation circuit 22, a power-line carrier (PLC) interface circuit 23 and a computer system 25. As will be described below, the isolation circuit 22, the PLC interface circuit 23, and the computer system 25 implement the aforementioned interface and intelligence for the device 14 to interact and communicate with other devices connected to the PL 21. Still further, the computer system 25 may also implement an ASA functionality. In a further refinement, the device 14 may include remote control circuitry that allows an operator or user to interact with the device or ASA. For example, the device may be a television with a remote control. The television is, in addition, configured to serve as the ASA. The user can then act as the AA, interacting with the ASA via the remote control.

In this embodiment, the computer system 25 is an embedded system that includes a controller 26, an interface circuit 27 and a memory 28. The controller 26 is implemented with a microcontroller, although in other embodiments other control circuits can be used such as, for example, a general-purpose microprocessor, a state machine, or other logic circuit. The memory 28 typically includes volatile (e.g., DRAM) and non-volatile memory (e.g., EPROM) for storing computer programs and data.

The isolation circuit 22 is connected to the PL 21 to isolate the PL signals' (typically 110VAC 60 Hz power in the U.S.) from the processing circuitry of the device 14. Isolation circuit 22 can be implemented with transformers or other magnetics, and is further configured to transmit and receive signals to and from the PL 21. The PLC interface 23 is essentially a modem for processing transmit and receive message signals between the PL 21 and the computer system 25. In one embodiment, the isolation circuit 22 and the PLC interface 23 are implemented using an I800 chipset available from ITRAN, Beer Sheva, Israel. In other embodiments, the PLC interface 23 can be implemented using other custom or semi-custom circuits (e.g., ASICs, PLDs, FPGAs, etc.) to implement a physical layer suitable for the environment of the shared media (e.g., PL, RF, fiber optic environments).

Figure 3:
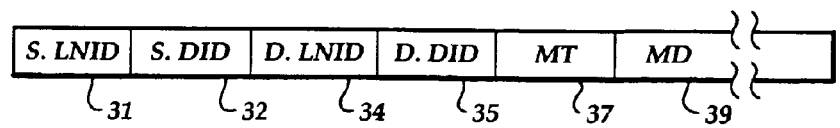
FIG. 3 is a diagram illustrating a general message format, according to one embodiment of the present invention.

FIG. 3 illustrates a general format for a message 30 used by the ASA and devices, according to one embodiment of the present invention. In this embodiment, the communication is implemented in a packet type protocol. The message 30 includes a source logical network ID (S.LNID) 31, a source device ID (S.DID) 32, a destination logical network ID (D.LNID) 34, a destination device ID (D.DID) 35, a message type field (MT) 37 and a message data field (MD) 39. For one embodiment, these fields are summarized in Table 1 below.

TABLE 1

| FIELD | DEFINITION |
|---|---|
| S.LNID | Contains the sending device's logical network ID with a value within a predetermined range. For example, the S.LNID ranges from 1 to 65535 in one embodiment. The value 65535 indicates that the sending device has no logical network ID (i.e., is not acquired). A value of zero is invalid. |
| S.DID | Contains the sending device's logical network device ID with a value within a predetermined range. For example, the S.DID ranges from 1 to 65535 in one embodiment. The value 1 indicates that the sending device is an ASA and the value 65535 indicates that the sending device has no logical network device ID. A value of zero is invalid. |
| D.LNID | Contains the destination (or recipient) device's logical network ID with a value in a predetermined range. For example, the D.LNID ranges from zero to 65534 in one embodiment. The value zero indicates that all logical networks on the shared media and all their devices are recipients. The D.DID field must be all zeros to use this option. |
| D.DID | Contains the destination (or recipient) device's logical network device ID with a value in a predetermined range. For example, the D.DID ranges from zero to 65534 in one embodiment. The value zero indicates that all devices within the D.LNID. |
| MT | Contains a code indicating the type of message is being sent. In one embodiment, the code indicates a transaction type (e.g., PING, INVITATION TO ANNOUNCE, ANNOUNCE, ASSIGN ID, FIND SERVICE, SERVICE ACKNOWLEDGMENT) and a transaction phase of the message (e.g., request, reply). |
| MD | Contains data in a format defined for each message type. In one embodiment, this field can be variable in length. |

In other embodiments, the message format can include additional fields such as, for example, a security field that indicates whether the message is encrypted, a transaction counter field for use with synching up reply messages to request messages and for detecting redundant messages. Embodiments of the message types referred to in Table 1 are summarized in Table 2 below.

TABLE 2

| MESSAGE TYPE (MT) | DEFINITION |
|---|---|
| PING | Tests for the presence of devices with the logical network defined in the S.LNID field and the D.LNID field (which must match the S.LNID to prevent pinging across logical networks).<br>The D.DID field can be set for a specific device in a ping request transaction phase. The corresponding ping response transaction phase would be generated by the targeted device, which responds with its GUID.<br>The D.DID field can be set to zero in a ping request message type to ping all of the devices in a logical network. The S.DID can be set to a predetermined value (e.g., 65535 for a 16-bit field) to ping a device and have the device broadcast its GUID to all of the devices in the logical network in the corresponding ping response transaction. |
| INVITATION TO ANNOUNCE | Triggers all targeted devices to perform an ANNOUNCE transaction (described below). In this embodiment, this transaction has only a request phase. Devices receiving this transaction can initiate an ANNOUNCE transaction. The message can be directed to all devices in a logical network or to all unacquired devices attached to the shared media. The MD field defines the targeted devices using two sub-fields. This scheme allows the use of masking to partition the ID space into manageable subsets.<br>The first sub-field is the Device ID Mask. The source device provides a mask in this sub-field to limit the ID space as desired. Each receiving device performs a masking step; i.e., a bit-wise logical AND operation with the mask and its D.DID. If all devices on the entire shared media are targeted (i.e., the D.LNID is set to zero), then the Device ID Mask must be set to a pre-selected number (e.g., 65535 or hexadecimal FFFF).<br>The second sub-field is the Device ID Selector. The source device provides a value in this field that each receiving device compares to the result of the masking step. If these values match, then that receiving device performs an ANNOUNCE transaction. |
| ANNOUNCE | Indicates the sending device's presence on the shared media or the logical network. In this embodiment, the device includes its GUID in the request transaction phase. There is no response transaction phase.<br>If the device has been targeted in an INVITATION TO ANNOUNCE transaction, the device targets the ANNOUNCE transaction to the originator of the INVITATION TO ANNOUNCE transaction.<br>Devices are also configured to perform an ANNOUNCE request phase transaction in response to entering an active state. A device typically enters the active state in response to receiving power, or being reset.<br>If the device is not acquired (i.e., does not have a LNID), the transaction is targeted toward all of the devices on the shared media. If the device is acquired (i.e., has a LNID), the transaction is targeted toward all devices on its logical network.<br>Optionally, the ANNOUNCE transaction request phase can include a predetermined amount of time. If the device is continually unresponsive to transactions targeted at the device for this amount of time, then the device is considered unacquired. |
| ASSIGN ID | Sets the acquisition state of a device. The ASSIGN ID transaction request phase includes the targeted device's GUID, with the D.DID field set to all devices of either a targeted logical network or the entire shared media (i.e., the D.LNID set to zero). In one embodiment, the MD field includes the GUID of the targeted device, the LNID and the DID to be assigned to the targeted device. There is no response phase for the ASSIGN ID phase. |

In light of the present disclosure, those skilled in the art can devise different message or transaction types in other embodiments of the present invention.

Figure 4:
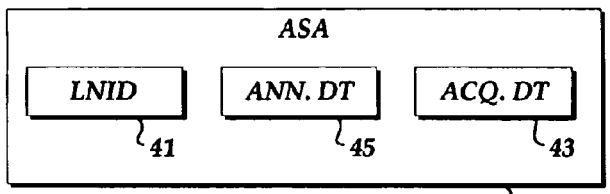
FIG. 4 is a diagram illustrating configuration structures in an ASA, according to one embodiment of the present invention.

FIG. 4 illustrates the configuration elements of a typical ASA 15, according to one embodiment of the present invention. In this embodiment, the ASA 15 includes a register 41 that stores the ASA's logical network ID. The ASA 15 also includes a data structure (e.g., a table) for storing the GUIDs of devices belonging to the logical network of ASA 15 (referred to herein as "acquired devices"). In this embodiment, an acquired device table 43 stores the GUIDs of acquired devices. Further, the ASA 15 includes another data structure that stores the GUIDs of devices that have performed an ANNOUNCE transaction but are not listed in the acquired device table 43 (referred to herein as "announced devices"). In this embodiment, an announced device table 45 stores the GUIDs of announced devices. As described below in conjunction with FIG. 8, tables 43 and 45 are used in adding a device to a logical network. In addition, in one embodiment, the register 41 and the tables 43 and 45 are implemented in non-volatile memory so that the data is not lost if the ASA 15 loses power.

Figure 5:
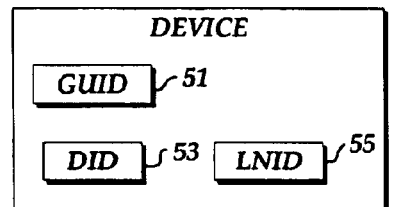
FIG. 5 is a diagram illustrating configuration structures in a device, according to one embodiment of the present invention.

FIG. 5 illustrates the configuration elements of a typical device 14, according to one embodiment of the present invention. In this embodiment, the device 14 includes registers 51, 53 and 55 that store the device's GULD, device ID and logical network ID, respectively. As previously described, the device's GUID is assigned when the device is manufactured (or instantiated when the device is a "soft device"). In this embodiment, the device's DID and logical network ID are assigned when the device is acquired into a logical network, as described below.

Figure 6:
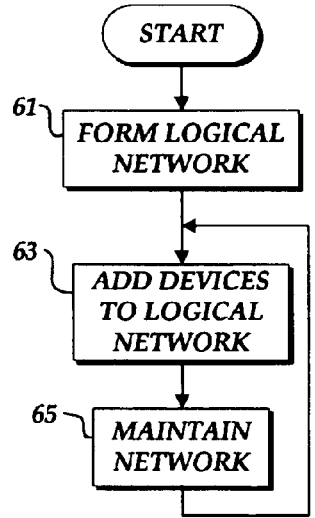
FIG. 6 is a flow diagram illustrating the basic operation of one embodiment of the present invention.

FIG. 6 illustrates the basic top-level operations of a logical network according to one embodiment of the present invention. Referring to FIGS. 1 and 6, a logical network operates as follows. For clarity, only the operation of the logical network $13_1$ is described since the operation of the other logical networks attached to the shared media 11 is essentially identical.

An initial operation 61 is to form a logical network. As previously described, a logical network includes an ASA and, typically, one or more devices attached to the shared media. In this case, the ASA $15_1$ forms a logical network $13_1$ by searching for an unused logical network ID when first attached to the shared media 11. When the ASA $15_1$ finds an unused logical network ID, the ASA $15_1$ adopts the ID as its logical network ID, thereby forming a logical network. One embodiment of this operation is described in more detail below in conjunction with FIG. 7.

After the logical network $13_1$ is formed, a next operation 63 is to add devices $14_1$ to the logical network $13_1$. In this embodiment, a device is added to the logical network $13_1$ by discovering that the device is attached to the shared media 11 and then acquiring the device. As described previously, the AA $16_1$ selectively authorizes the acquisition of the device. One embodiment of this operation is described in more detail below in conjunction with FIG. 8.

Operation 65 of the logical network $13_1$ is to maintain the network. The ASA $15_1$ helps maintain the logical network $13_1$ through several operations, including monitoring communication on the shared media 11, sending messages to devices attached to the shared media, and polling inactive devices of the logical network $13_1$. The ASA $15_1$ uses these operations to add devices to and to remove inactive or disconnected devices from the logical network $13_1$. One embodiment of this operation is described in more detail below in conjunction with FIG. 11.

Figure 7:
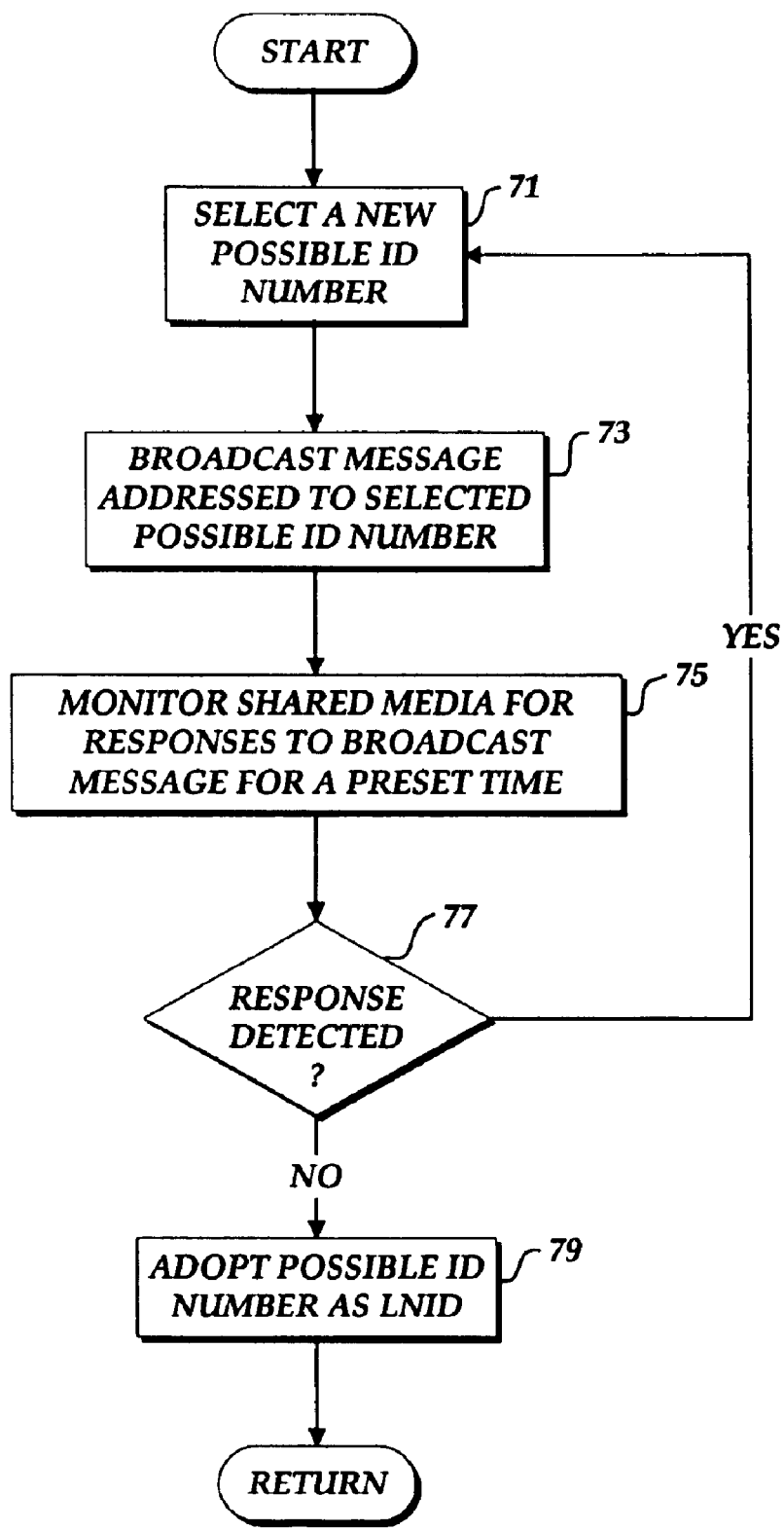
FIG. 7 is a flow diagram illustrating the operations in forming of a logical network, according to one embodiment of the present invention.

Although FIG. 6 illustrates operation 65 sequentially following operation 63, in light of this disclosure, those skilled in the art will appreciate that these operations are on-going background tasks that can be performed in a different order or in parallel. These operations provide a simple system to segment a shared media into several logical networks. In addition, the system provides an easy-to-use mechanism, suitable for the general public, for connecting and disconnecting devices to a network without disrupting the operation of the network. FIG. 7 illustrates an operational flow for forming of a logical network, according to one embodiment of the present invention. Referring to FIG. 1 (for clarity) and FIG. 7, a logical network is formed as follows.

A select operation 71 in the ASA $15_1$ selects a possible new ID number. In one embodiment, the select operation 71 generates a pseudo random number between 1 and 65534 (i.e., a sixteen bit number) using conventional techniques. In a further refinement, the ASA $15_1$ can be configured so that the select operation 71 checks whether the generated pseudorandom number is one that the ASA $15_1$ had used before in trying to form a logical network. This pseudorandom number represents a possible logical network ID.

A broadcast operation 73 in the ASA $15_1$ broadcasts a message addressed to the entire logical network selected in operation 71. In one embodiment, the broadcast operation 71 sends a PING message (see Table 2) using the selected pseudorandom number as the D.LNID and S.LNID (which must match, as stated in Table 1), the D.DID set to zero, and the S.DID set to 65535 (hexadecimal FFFF). As indicated in Table 1, setting the D.DID to zero and the S.DID to 65535 in a message addresses every device of the targeted logical network (addressed in the D.LNID). As previously described, each device (if any) attached to the selected logical network is configured to respond to this PING message with its GUID.

A monitor operation 75 monitors the shared media 11 for responses, if any, to the PING message within a predetermined time. In one embodiment, the monitor operation 75 waits for responses occurring within three seconds of the PING message. In normal operation, a response will be detected only if the selected ID is already being used as a logical network ID by another ASA.

A test operation 77 detects if a valid response if received. If it is received, the operation flow returns to the operation 71 to select another possible number to use as a logical network ID. However, if the test operation 77 does not detect a valid response within the time frame, the operation flow proceeds to an adopt operation 79. The adopt operation 79 adopts the selected pseudorandom number as its logical network ID.

In a further refinement, the ASA $15_1$ can be configured to repeat operations 73, 75 and 77 one or more times without a valid response before adopting the pseudorandom number as its logical network ID. For example, in one embodiment, the ASA $15_1$ must perform operations 73, 75 and 77 three times without a valid response before adopting the pseudorandom number as its logical network ID. In this particular refinement, if a valid response is detected during any of these attempts, the process returns to operation 71 for selection of a new possible logical network ID number, which must again be tested three times before being adopted as the logical network ID.

Figure 8:
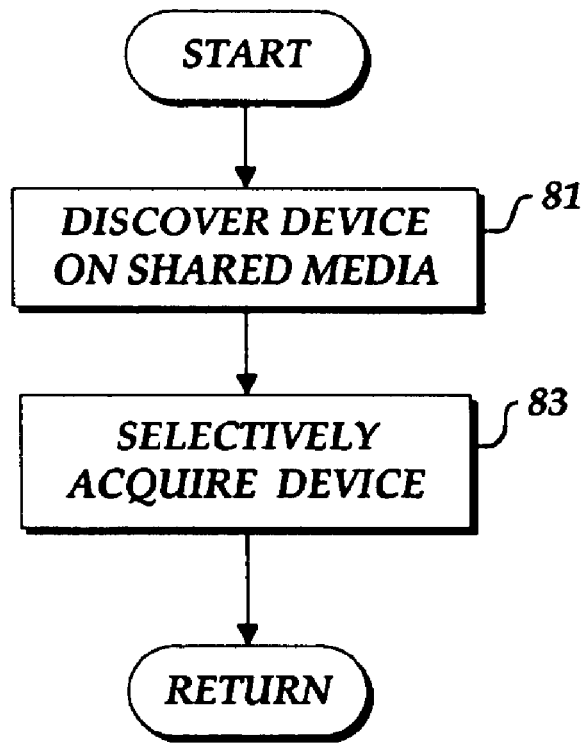
FIG. 8 is a flow diagram illustrating the operations in adding a device to a logical network, according to one embodiment of the present invention.

FIG. 8 illustrates the operation flow of adding a device to a logical network, according to one embodiment of the present invention. In this embodiment, to add a device $14_1$ (FIG. 1) to a logical network $13_1$ (FIG. 1), the device $14_1$ is first discovered by a discover module 81. In this embodiment, the discovery process begins when the device $14_1$ sends out an ANNOUNCE message as described in Table 1. The device $14_1$ may send the ANNOUNCE message either as the result of being activated, or by being targeted by the ASA $15_1$ (FIG. 1) in an INVITATION TO ANNOUNCE message. One embodiment of this operation is described in more detail below in conjunction with FIG. 9.

Once a device is discovered, the device is selectively acquired by an acquisition module 83. In this embodiment, the acquisition module 83 determines whether or not to acquire the device $14_1$, according to predetermined criteria. In one embodiment, the ASA $15_1$ is configured so that the acquisition module 83 only acquires devices that are have not been acquired, or have been acquired but reset. In addition, the AA $16_1$ (FIG. 1) must authorize the acquisition of the device $14_1$. One embodiment of this operation is described in more detail below in conjunction with FIG. 10.

Figure 9:
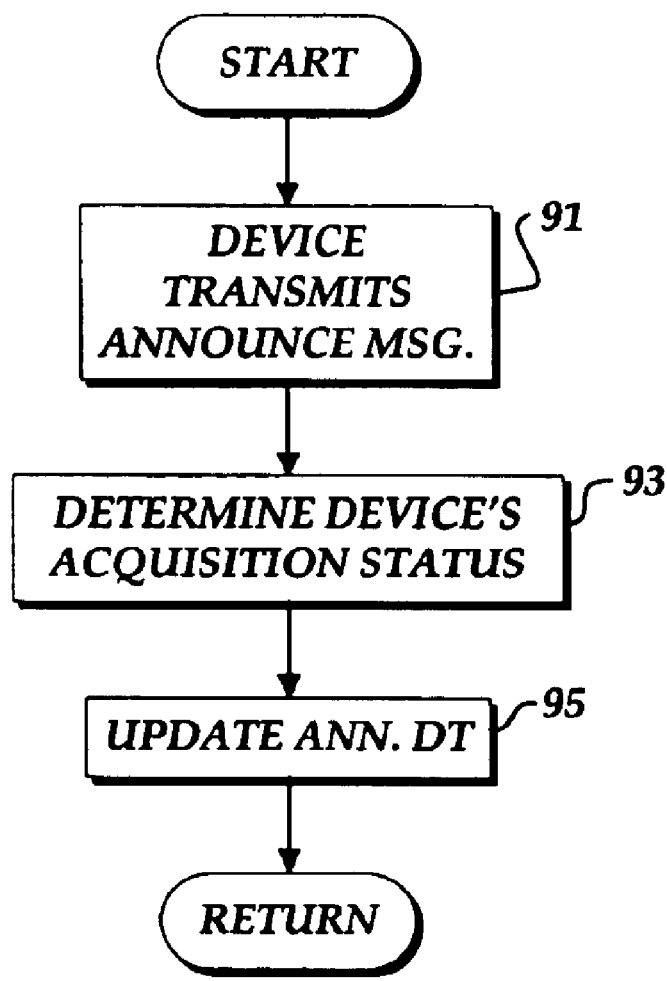
FIG. 9 is a flow diagram illustrating the operations in discovering a device as depicted in FIG. 8, according to one embodiment of the present invention.

FIG. 9 illustrates the operational flow for discovering a device, according to one embodiment of the present invention. In this embodiment, a transmit operation 91 in the device transmits an ANNOUNCE message. In particular, if the device has been targeted in an INVITATION TO ANNOUNCE transaction, the device targets the ANNOUNCE transaction to the originator of the INVITATION TO ANNOUNCE transaction (typically the ASA). In one embodiment, the ASA, just prior to sending out a set of INVITATION TO ANNOUNCE messages, clears the announced device table 45 (FIG. 4).

As previously described, devices are also configured to perform an ANNOUNCE request phase transaction in response to entering an active state. A device typically enters the active state in response to receiving power, or being reset. For example, the device may be configured to reset in response to a power glitch, or manually reset by the user through a reset button, or reset in response to being reconfigured or reprogrammed, or in response to other circumstances as configured by the maker of the device. The resetting of a device may vary from device-to-device.

Then, a status operation 93 determines the announcing device's status. In one embodiment, the ASA is configured to process the ANNOUNCE message from the device, in conjunction with data stored in the acquired device table 43 (FIG. 4) and the announced device table 45 (FIG. 4). In particular, the ASA processes the data in the S.LNID and S.DID fields of the ANNOUNCE message and compares this data to the data stored in the acquired device table and the announced device table to categorize the announcing device into one of several classes. In this embodiment, there are five classes; namely, unacquired devices, reset but acquired devices, already acquired devices, out of date devices, and ASA with same logical network ID. These classes are summarized in Table 3 below. In this embodiment, devices not falling into one of these classes are ignored by the ASA.

TABLE 3

| CLASS | DEFINITION |
|---|---|
| Unacquired | The device's logical network ID and device ID are both set to a predetermined value (e.g., 65535) and the device's GUID is not in the ASA's acquired device table. Typically, the device is in this class when it is initially connected to the shared media. |
| Reset but | The device's logical network ID and device ID are both set |

TABLE 3-continued

| CLASS | DEFINITION |
|---|---|
| Acquired | to the predetermined value (e.g., 65535) but the device's GUID is already stored in the ASA's acquired device table. The device may be in this class when the device has been erroneously reset to an unacquired state. |
| Already Acquired | The device's logical network ID matches the ASA's logical network ID and the device's device ID and GUID. The device may be in this class when it has been acquired and is in the process of maintaining its membership in its logical network. |
| Out of Date | The device's logical network ID matches the ASA's logical network ID, but its device ID is either (1) not in the ASA's acquired device table or (2) its device ID is in the ASA's acquired device table but its GUID does not match the GUID recorded in the ASA's acquired device table. |
| ASA with same LNID | The device's logical network ID matches the ASA's logical network ID, but the device's device ID indicates that the device is also an ASA. This is a fault situation in which a logical network ID has been assigned to two or more ASA's that are connected to one shared media. |

If the device falls into the "unacquired" class, an operation 95 then stores the device's GUID in the ASA's announced device table. In this embodiment, the ASA will attempt to acquire the device, as described below in conjunction with FIG. 10. The operation 95 is bypassed if the device does not fall into the "unacquired" class.

If the device falls into the "reset but acquired" class, the ASA automatically reacquires the device, as described below in conjunction with FIG. 10, except that the ASA uses the device's current device ID rather than assigning a new device ID.

If the device falls into the "already acquired" class, the ASA updates its status information for this device. For example, the ASA may maintain a log of the device's activity, which the ASA checks during maintenance. The ASA may use this activity log to determine whether the device is active or whether the device is inactive and should be investigated further for removal from the logical network. This operation is described below in more detail in conjunction with FIG. 11.

If the device falls into the "out-of-date" class, in one embodiment, the ASA configures the device into the unacquired state so that the device can undergo the discovery and acquisition operations. In this embodiment, the ASA resolves out-of-date devices. For example, an out-of-date device may be detected in operation 93. To resolve the out-of-date device, the ASA sets the device into an unacquired state. In one embodiment, the ASA targets an ASSIGN ID message to the out-of-date device with the new logical network ID and the new device ID set to 65535 (i.e., the values for unacquired devices as set forth in Table 2). The ASA then verifies that the device has been configured into the unacquired state using a PING transaction targeted to the entire shared media with the device's GUID (i.e., with the MT field having the device's GUID). This transaction is described in Table 2. The ASA may be configured to make one or more additional verification attempts. If the verification fails, in one embodiment, the device is simply left in the out-of-date list and will be processed again in a subsequent ANNOUNCE transaction. If the verification is successful, the device is unacquired and thus, should send an ANNOUNCE transaction to become acquired.

If the device falls into the "ASA with same logical network ID" class, the ASA halts all background processing to correct this fault condition. The ASA then obtains a new logical network ID as described above in conjunction with FIG. 7. The ASA then updates each device in its acquired device table with the new logical network ID. In one embodiment, the ASA performs this updating operation by forming a "reassigned device" table by making a copy of its current acquired device table. The ASA then determines whether the device is "out-of-date". If so, the device is removed from the reassigned device table and the ASA proceeds to the next entry in the table.

However, if the device is not in the "out-of-date" class, the ASA sends an ASSIGN ID transaction to the device to update the logical network ID of the device with the new logical network ID, leaving the device ID unchanged.

Afterwards, the ASA verifies the update using one or more PING transactions targeted at the device. If the update is verified, the device is removed from the reassigned device table. If the verification process fails, the ASA attempts another ASSIGN ID transaction, up to some predetermined number of attempts, after which the ASA proceeds to the next entry in the reassigned device table.

This process is repeated for all remaining devices listed in the reassign device table. Then, after all of the devices listed in the reassigned device table have been processed, normal processing is resumed.

Figure 10:
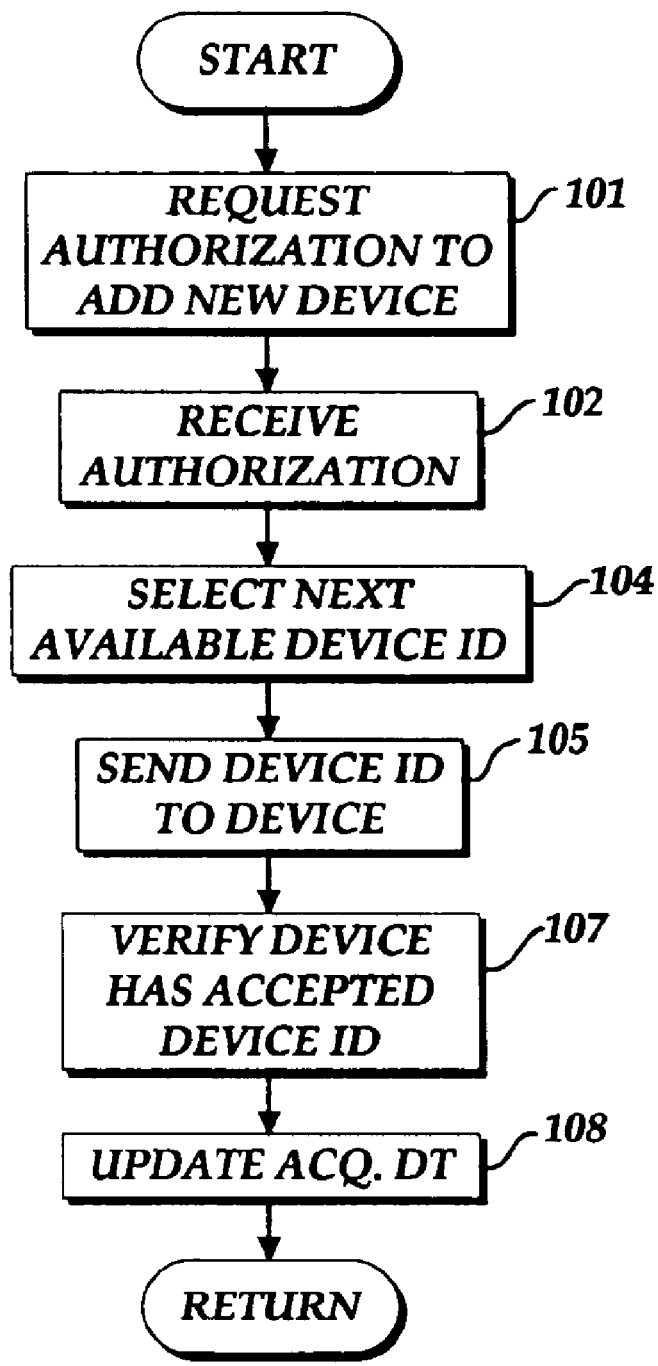
FIG. 10 is a flow diagram illustrating the operations in acquiring a device as depicted in FIG. 8, according to one embodiment of the present invention.

FIG. 10 illustrates the operational flow for acquiring a device, according to one embodiment of the present invention. In this embodiment, an operation 101 requests or prompts authorization from the AA (see FIG. 1) to add a device that has been discovered as described above in conjunction with FIG. 9.

Then the AA may provide authorization, which would then be received by an operation 102 in the ASA. However, the AA may withhold authorization, in which case the ASA would return to normal processing. If authorization is received from the AA, a select operation 104 selects a next available device ID, as indicated by a operation 104. In one embodiment, the device IDs are assigned in numerical order, so the last assigned device ID is simply incremented and assigned to the current device.

A send operation 105 sends the selected device ID to the device using an ASSIGN ID transaction using the device's GUID (see Table 2). A verification operation 107 verifies the device ID assignment to determine that the device ID was accepted by the device. In this embodiment, this operation is performed by the ASA by sending a PING transaction targeted at the device's newly assigned device ID. If the ASA receives the expected response within a predetermined time period, an update operation 108 updates the acquired device table in the ASA. In this embodiment, the device's newly assigned device ID and GUID are entered in the acquired device table and the device's GUID is removed from the announced device table. However, in this embodiment, if the verification operation 107 fails, the ASA is configured to retry the verification operation 107 for a predetermined number of attempts. For example, in this embodiment, up to three attempts may be made to verify that the device ID was assigned. If the repeated verification operations fail, the device's GUID is removed from the announced device table.

In an alternative embodiment, a device added to the shared media may be assigned a logical network ID and/or a device ID via manual entry. In this type of embodiment, the ASA may support a transfer device (e.g., a wand, memory card, diskette, etc.), through which the ASA provides the logical network ID or the device ID directly to the device outside of the shared media. That is, the transfer device is uploaded by the ASA with the ID information, and then physically taken to the device so that the ID information can be downloaded to the device. Further, after the device is loaded with the logical network ID or device ID, the transfer device can be taken back to the ASA to trigger the aforementioned verification operation.

Figure 11:
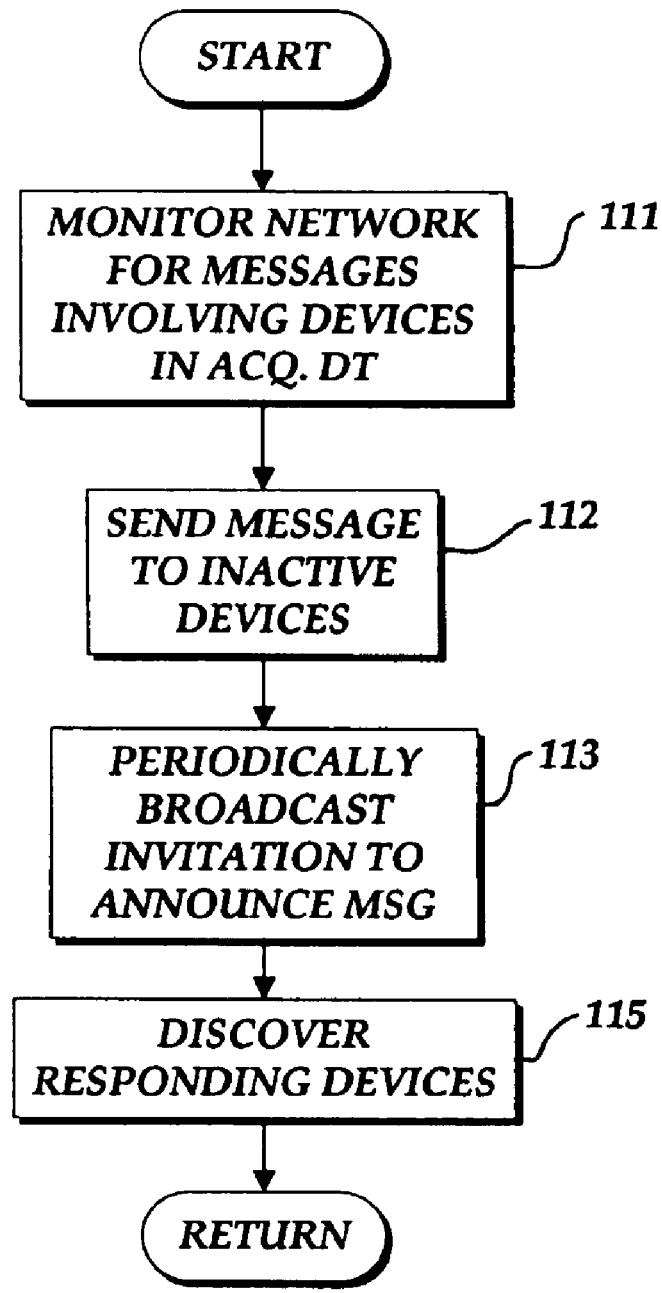
FIG. 11 is a flow diagram illustrating the operations in maintaining a logical network, according to one embodiment of the present invention.

FIG. 11 illustrates the operational flow for maintaining a logical network, according to one embodiment of the present invention. This process is desirable because devices may be removed, fail, or reassigned due to an error or glitch. However, some devices incorporated in some electronic appliances can go offline for significant periods of time in normal operation. Thus, the maintenance process should not remove such devices from the logical network unless the period of inactivity is unusual for the particular device. Thus, in one embodiment, the ASA also includes "maximum offline time" and "time to expire" entries in its acquired device table for each acquired device. The "time to expire" entry represents the time remaining in counting down the "maximum offline time" from the time of the device's last activity.

In FIG. 11, a monitor module 111 monitors the shared media for messages involving devices listed in the ASA's acquired device table (i.e., acquired devices). In this embodiment, every time the monitor module 111 detects a message from an acquired device, the ASA resets the "time to expire" entry to the value listed in the "maximum offline time" entry. For example, the ASA may receive an ANNOUNCE transaction from an acquired device, or the device may be responding to a PING transaction. The ASA may also be configured to snoop the shared media for communication from an acquired device to other device on the shared media. A device may use an ANNOUNCE transaction to update or reconfigure the "maximum offline time" entry.

If a device is inactive for a significant period of time (for example, after the "time to expire" expires), a send operation 112 in the ASA sends a message to the inactive device. In one embodiment, the ASA will target a PING transaction at the inactive device and monitor the shared media for the expected response. If the device remains inactive, the ASA removes the devices entries from the acquired device table. Further, in other embodiments, the ASA can be configured so that the send operation 112 makes a predetermined number of additional attempts to PING the inactive device if no valid response is received.

A broadcast operation 113 in the ASA can be configured to periodically target INVITATION TO ANNOUNCE messages to all devices attached to the ASA's logical network. This operation allows the ASA to detect devices that think they are part of the ASA's logical network but are not listed in the ASA's acquired device table. In addition, the ASA may be configured to use the masking operations described in Table 2 to balance traffic on the shared media.

The ASA can also be configured to target the INVITATION TO ANNOUNCE transaction to the entire shared media (not just its own logical network), as described in Table 2 to detect devices that have not yet been acquired by a logical network. Any such devices will be triggered to target an ANNOUNCE message to the ASA, as previously described. In response to such an ANNOUNCE message, a discover module 115 in the ASA attempts to add the device. In this embodiment, the ASA attempts to add the device as described above in conjunction with FIG. 8.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of implementing a network of devices connected to a shared media, the devices being a part of a consumer electronic appliance, the method comprising:

forming a logical network on the shared media, the logical network including an address space arbiter (ASA) coupled to the shared media;

discovering a device coupled to the shared medium by communication between the ASA and the device;

acquiring the discovered device, the acquired device being a member of the logical network;

receiving a message from the device over the shared media;

comparing information associated with the device included in the message to information associated with devices in an acquired device table, the acquired device table being arranged to include information associated with devices that are members of the logical network;

adding information associated with the device to an announced device table if the information is not stored in the acquired device table and the device is unacquired, wherein the announced device table includes information associated with discovered but unacquired devices;

comparing elapsed time since the device last transmitted a message over the shared media to a predetermined inactive time limit;

sending a message to the device;

monitoring the shared media for a valid message from the device that is responsive to the message;

removing the device from the logical network if the elapsed time exceeds the maximum inactive time limit; and resetting the elapsed time if the device provides a valid responsive message within a predetermined time period.

2. The method of claim 1 wherein acquiring the discovered device comprises acquiring the discovered device by operation of an acquisition authority (AA).

3. The method of claim 1 further comprising adding a plurality of devices to the logical network, the plurality of devices being coupled to the shared media and configured to send and receive messages over the shared media, the plurality of devices being responsive to messages sent over the shared media that are addressed to the logical network.

4. The method of claim 1 further comprising forming a second logical network on the shared media by operation of a second ASA, members of the second logical network being configured to respond to messages carried on the shared media addressed to the second logical network and not to respond to messages carried on the shared media that are addressed to the logical network.

5. The method of claim 1 wherein the shared media comprises a power-line of a building.

6. The method of claim 1 wherein forming a logical network comprises:

selecting an ID number by operation of the ASA;

broadcasting a message addressed to a logical network having the selected ID number as its logical network ID;

monitoring the shared media for a response to the broadcasted message; and adopting the selected ID number as the logical network ID for the logical network.

7. The method of claim 1 wherein discovering a device comprises:
receiving a message from the device in the ASA; and
determining whether the device is unacquired.

8. The method of claim 1 wherein acquiring the discovered device further comprises:
assigning a logical device identifier to the device the logical device, identifier being information associated with the device;
assigning a logical network identifier to the device, the logical network identifier being a logical network ID associated with the formed logical network, the logical network identifier being information associated with the device;
adding the logical device identifier and a globally unique identifier associated with the device to the acquired device table, the globally unique identifier being information associated with the device; and
removing the logical device identifier and the globally unique identifier associated with the device from the announced device table.

9. The method of claim 8 further comprising assigning the logical network ID as the device's logical network identifier if the device's globally unique identifier is stored in the acquired device table but the device's logical network identifier and logical device identifier indicate that the device is unacquired.

10. The method of claim 8 further comprising leaving the device's logical network identifier and logical device identifier unchanged if the device's globally unique identifier, logical network identifier and logical device identifier match those stored in the acquired device table for an acquired device.

11. The method of claim 8 further comprising configuring the device into an unacquired state if the device's logical network identifier matches the logical network ID but either the device's logical network identifier or the device's globally unique identifier do not match those stored in the acquired device table for an acquired device.

12. The method of claim 8 further comprising obtaining a new logical network ID if the device's logical network identifier matches the logical network ID but the device's logical device identifier indicates that the device is an ASA.

13. The method of claim 1 wherein the device is implemented as a process of an executing computer program.

14. The method of claim 1 wherein the device is configurable to set the maximum inactive time limit by sending a message to the ASA that includes a value for the maximum inactive time limit.

15. The method of claim 1 wherein the ASA includes a table that is configured to store the elapsed time and the maximum inactive time period.

16. A method of communication between devices on a shared media, the shared media being configurable to support communication within one or more logical networks, each logical network having a logical network ID and each device having a globally unique identifier, a logical network identifier, and a logical device identifier, the method comprising:
coupling a sending device and a receiving device on the shared media;
formatting a message for transmission on the shared media from the sending device to the receiving device, wherein the message includes:
a source logical network ID field configured to contain the logical network ID of the logical network of which the sending device is a member,
a source device ID field configurable to contain the logical device identifier,
a destination logical network ID field configurable to contain the logical network ID of which the receiving device is a member,
a destination device ID field configurable to contain the logical device ID of the receiving device,
a message type field configurable to contain a code indicative of information contained in the message, and
a message data field configurable to contain data;
transmitting the message from the sending device to the receiving device over the shared media;
comparing the sending device's globally unique identifier, logical network identifier, and logical device identifier to those of the receiving device, the globally unique identifier, logical network identifier and logical device identifier of the sending device being stored in an acquired device table;
adding the receiving device's globally unique identifier, logical network identifier, and logical device identifier to an announced device table if the receiving device's globally unique identifier is not stored in the acquired device table and the receiving device's logical network identifier and logical device identifier indicate that the receiving device is unacquired:
comparing elapsed time since the receiving device last transmitted a message over the shared media to a predetermined maximum inactive time limit;
monitoring the shared media for a valid message from the receiving device that is responsive to the message;
removing the receiving device from the logical network if the elapsed time exceeds the maximum inactive time limit; and
resetting the elapsed time if the receiving device provides a valid responsive message within a predetermined time period.

17. The method of claim 16 wherein the destination logical network ID field is configurable to contain a code representing all logical networks on the shared media.

18. The method of claim 16 wherein the destination device ID field is configurable to contain a code representing all devices of the logical network indicated in the destination logical network ID field.

19. The method of claim 16 wherein the source device ID field is configurable to contain a code representing that the sending device has no logical device ID.

20. The method of claim 16 wherein the source logical network ID field is configurable to contain a code representing that the sending device is not a member of a logical network.

21. A system for supporting communication between devices connected to a shared media, the devices being a part of a consumer electronic appliance, the system comprising
a device coupled to the shared media, wherein the device is configured to send and receive messages over the shared media;
an address space arbiter (ASA) coupled to the shared media, the ASA being configurable to form a logical network with one or more devices connected to the shared media and to discover a device on the shared media by:

receiving a message from the device over the shared media;

comparing information associated with the device included in the message to information associated with devices in an acquired device table, the acquired device table being arranged to include information associated with devices that are members of the logical network; and adding information associated with the device to an announced device table if the information is not stored in the acquired device table and the device is unacquired, wherein the announced device table includes information associated with discovered but unacquired devices; and an acquisition authority (AA) at least intermittently coupled to the ASA, wherein the AA is configured to the selectively authorized the ASA to add a device to the logical network, and wherein the AA is further configured to detect an inactive device by:

comparing an elapsed time since the device last transmitted a message over the shared media to a predetermined maximum inactive time limit sending a message to the device, monitoring the shared media for a valid message from the device that is responsive to the message, removing the device from the logical network if the elapsed time exceeds the maximum inactive time limit, and resetting the elapsed time if the device transmits a valid responsive message over the shared media within a predetermined time period, wherein the logical network has a logical network ID, the ASA and any device of the logical network are configured to be responsive to messages sent over the shared media that are addressed to the logical network.

22. The system of claim 21 wherein the device is implemented as a process of an executing computer program.

23. The system of claim 21 further comprising a second ASA and a second set of one or more devices coupled to the shared media, the second ASA and the second group of devices forming a second logical network on the shared media, members of the second logical network being configured to respond to messages carried on the shared media addressed to the second logical network and not respond to messages carried on the shared media that are addressed to the logical network.

24. The system of claim 21 wherein the shared media comprises a power-line of a building.

25. The system of claim 21 wherein the ASA includes a control unit.

26. The system of claim 25 wherein the control unit is implemented with a computer system.

27. The system of claim 25 wherein the control unit of the ASA is configured to form a logical network by:

selecting an ID number;

broadcasting a message addressed to a logical network having the selected ID number as its logical network ID, monitoring the shared media for a response to the broadcasted message; and adopting the selected ID number as the logical network ID for the logical network.

28. The system of claim 25 wherein the control unit of the ASA is configured to acquire a device by:

receiving authorization to acquire the device from the AA;

assigning a logical device identifier to the device, the logical device identifier being information associated with the device;

assigning the logical network ID as a logical network identifier to the device, the logical network identifier being information associated with the device;

adding the logical device identifier and a globally unique identifier associated with the device to the acquired device table, the globally unique identifier being information associated with the device; and removing the logical device identifier and the globally unique identifier associated with the device from the announced device table.

29. The system of claim 21 wherein the device is configurable to set the maximum inactive time limit by sending a message to the ASA that includes a value for the maximum inactive time limit.

30. A computer-readable medium having computer-executable instructions for performing steps comprising:

forming a logical network on the shared media, the logical network including an address space arbiter (ASA) coupled to the shared media, the logical network having a logical network ID;

adding a device to the logical network;

receiving a message from the device over the shared media;

comparing information associated with the device included in the message to information associated with devices in an acquired device table, the acquired device table being arranged to include information associated with devices that are members of the logical network;

adding information associated with the device to an announced device table if the information is not stored in the acquired device table and the device is unacquired, wherein the announced device table includes information associated with discovered bit unacquired devices;

comparing an elapsed time since the device last transmitted a message over the shared media to a predetermined maximum inactive time limit, sending message to the device;

monitoring the shared media for a valid message from the device that is responsive to the message;

removing the device from the logical network if the elapsed time exceeds the maximum inactive time limit; and resetting the elapsed time if the device transmits a valid responsive message over the shared media within a predetermined time period.

31. The computer-readable medium of claim 30, wherein adding a device comprises computer-executable instructions for performing the steps of:

discovering the device coupled to the shared medium by communication between the ASA and the device; and acquiring the discovered device by operation of an acquisition authority (AA), the acquired device being a member of the logical network.

32. The computer-readable medium of claim 30, wherein forming a logical network comprises computer-executable instructions for performing the steps of:

selecting an ID number by operation of the ASA;

broadcasting a message addressed to a logical network having the selected ID number as its logical network ID;

monitoring the shared media for a response to the broadcasted message; and adopting the selected ID number as the logical network ID for the logical network.

33. The computer-readable medium of claim 31, wherein discovering the device comprises computer-executable instructions for performing the steps of:

receiving a message from the device in the ASA; and determining whether the device is unacquired.

34. The computer-readable medium of claim 31, wherein acquiring the device further comprises computer-executable instructions for performing the steps of:

assigning a logical device identifier to the device, the logical device being information associated with the device;

assigning the logical network ID as a logical network identifier to the device, the logical network identifier being information associated with the device;

adding the logical device identifier and a globally unique identifier associated with the device to acquired device table, the globally unique identifier being information associated with the device; and removing the logical device identifier and the globally unique identifier associated with the device from the announced device table.

35. A system for implementing a network of devices connected to a shared media, the devices being part of a consumer electronic appliance, the system comprising:

means for forming a logical network on the shared media, the logical network having a logical network ID;

means for adding a device to the logical network;

means for receiving a message from the device over the shared media;

means for comparing information associated with the device included in the message to information associated with devices in an acquired device table, the acquired device table being arranged to include information associated with devices that re members of the logical network;

means for adding information associated with the device to an announced device table if the information is not stored in the acquired device table and the device is unacquired, wherein the announced device table includes information associated with discovered but unacquired devices;

means for comparing an elapsed time since the device last transmitted a message over the shared media to a predetermined maximum inactive time limit:

means for sending a message to the device;

means for monitoring the shared media for a valid message from the device that is responsive to the message;

means for removing the device from the logical network if the elapsed time exceeds the maximum inactive time limit; and means for resetting the elapsed time if the device transmits a valid responsive message over the shared media within a predetermined time period.

36. The system of claim 35 wherein the means for adding a device comprises:

means for discovering the device coupled to the shared medium; and means for acquiring the discovered device, the acquired device being a member of the logical network.

* * * * *